(12) United States Patent
Ohnishi et al.

(10) Patent No.: US 6,813,381 B2
(45) Date of Patent: Nov. 2, 2004

(54) METHOD AND APPARATUS FOR IDENTIFICATION OF DOCUMENTS, AND COMPUTER PRODUCT

(75) Inventors: Masatoshi Ohnishi, Hyogo (JP); Hirofumi Kameyama, Hyogo (JP)

(73) Assignee: Glory Ltd., Hyogo (JP)

( * ) Notice: Subject to any disclaimer, the term of this patent is extended or adjusted under 35 U.S.C. 154(b) by 647 days.

(21) Appl. No.: 09/810,709

(22) Filed: Mar. 19, 2001

(65) Prior Publication Data
US 2002/0018071 A1 Feb. 14, 2002

(30) Foreign Application Priority Data
Mar. 30, 2000 (JP) ........................................ 2000-095514

(51) Int. Cl.⁷ .............................. G06K 9/46; G06K 9/66
(52) U.S. Cl. ...................... 382/192; 382/163; 382/199; 382/202; 382/258; 715/510
(58) Field of Search ................................. 382/170–180, 382/190, 198, 199, 202, 217–219, 305–306, 163, 258; 715/509–510

(56) References Cited

U.S. PATENT DOCUMENTS

| | | | |
|---|---|---|---|
| 6,163,618 A | 12/2000 | Mukai | |
| 6,226,402 B1 * | 5/2001 | Katsuyama | 382/171 |
| 6,327,387 B1 * | 12/2001 | Naoi et al. | 382/190 |
| 6,628,832 B2 * | 9/2003 | Kanatsu | 382/173 |
| 6,654,495 B1 * | 11/2003 | Katoh et al. | 382/178 |

FOREIGN PATENT DOCUMENTS

| | | |
|---|---|---|
| CN | 1218234 A | 12/2000 |
| JP | 4-268685 | 9/1992 |

* cited by examiner

Primary Examiner—Bhavesh M. Mehta
Assistant Examiner—Gregory Desire
(74) Attorney, Agent, or Firm—Foley & Lardner LLP (57) ABSTRACT

In the document identification apparatus, a ruled line feature extraction section determines a black pixel ratio of a document to be identified, and adds the black pixel ratio for each block to extract a ruled line feature. A ruled line feature verification section verifies the ruled line feature with a ruled line feature already registered in a ruled line feature dictionary to thereby identify the document. If identification is not possible with this procedure, a details judgment section verifies the image data in a specific area with the image data (characters or the like) registered in a specific area dictionary.

14 Claims, 7 Drawing Sheets

|   | 0 | 1 | 2 | 3 | 4 | 5 |
|---|---|---|---|---|---|---|
| a | 0.00 | 0.00 | 0.00 | 0.00 | 0.00 | 0.00 |
| b | 0.33 | 0.67 | 1.00 | 1.00 | 0.67 | 0.33 |
| c | 0.33 | 0.33 | 0.33 | 0.33 | 0.33 | 0.33 |
| d | 0.33 | 0.33 | 0.33 | 0.33 | 0.33 | 0.33 |
| e | 0.33 | 0.67 | 1.00 | 1.00 | 0.67 | 0.33 |
| f | 0.00 | 0.00 | 0.00 | 0.00 | 0.00 | 0.00 |

FIG.3C

|   | 0 | 1 | 2 | 3 | 4 | 5 |
|---|---|---|---|---|---|---|
| a | 0.00 | 0.33 | 0.33 | 0.33 | 0.33 | 0.00 |
| b | 0.00 | 0.67 | 0.33 | 0.33 | 0.67 | 0.00 |
| c | 0.00 | 1.00 | 0.33 | 0.33 | 1.00 | 0.00 |
| d | 0.00 | 1.00 | 0.33 | 0.33 | 1.00 | 0.00 |
| e | 0.00 | 0.67 | 0.33 | 0.33 | 0.67 | 0.00 |
| f | 0.00 | 0.33 | 0.33 | 0.33 | 0.33 | 0.00 |

| 1.00 | 2.00 | 1.00 |
|------|------|------|
| 1.32 | 1.32 | 1.32 |
| 1.00 | 2.00 | 1.00 |

FIG.3F

| 1.00 | 1.32 | 1.00 |
|------|------|------|
| 2.00 | 1.32 | 2.00 |
| 1.00 | 1.32 | 1.00 |

SAVINGS ACCOUNT CREDIT SLIP (FOR NEW ACCOUNT)

| APPLICATION DATE | YEAR: MONTH: DAY: | | SUMMARY (1) | SUMMARY (1) | ACCOUNT NUMBER | | SEAL OF APPROVAL |
|---|---|---|---|---|---|---|---|
| | | | | | | | RECEIVED BY |

AMOUNT ¥ 0
BREAK-DOWN | CASH

| ADDRESS | PHONETIC TRANSCRIPTIONS IN KANA 〒☐☐☐-☐☐☐☐ | | |
|---|---|---|---|
| | ROOM NUMBER | APARTMENT DORMITORY・C/O | |
| PHONETIC TRANSCRIPTIONS IN KANA | | | |
| NAME | | | |

| DATE OF BIRTH | YEAR: MONTH: DAY: | | SEX | MALE/FEMALE |
|---|---|---|---|---|
| OCCUPATION | COMPANY NAME | TEL. NO | HOME OFFICE | ( ) |

SEAL OF APPROVAL

FIG.7A

APPLICATION DOCUMENT FOR JOINING ABC CARD — FOR INDIVIDUAL

TO : DEF CARD K.K.
TO : K. K. ABC

1. PLEASE WRITE IN ALL ITEMS

① DESIRED CARD

| ① GOLD CARD | | ② ORDINARY CARD | |
|---|---|---|---|
| IF GOLD CARD IS NOT ISSUED AS A RESULT OF EXAMINATION, DO YOU WANT TO APPLY FOR THE ORDINARY CARD? | ① WANT TO APPLY | ② NO, I DON'T WANT TO APPLY | |

② ABC REVOLVING CARD — ANNUAL FEE : FREE

| (A) TO APPLY FOR BOTH THE ORIGINAL MEMBER AND FAMILY MEMBER | (B) TO APPLY FOR ONLY THE ORIGINAL MEMBER | (C) NOT TO APPLY FOR |
|---|---|---|

FIG.7B

APPLICATION DOCUMENT FOR JOINING ABC CARD — FOR INDIVIDUAL

TO : K.K.ABC
TO : K. K. ABC HOKKAIDO

1. PLEASE WRITE IN ALL ITEMS

① DESIRED CARD

| ① GOLD CARD | | ② ORDINARY CARD | |
|---|---|---|---|
| IF GOLD CARD IS NOT ISSUED AS A RESULT OF EXAMINATION, DO YOU WANT TO APPLY FOR THE ORDINARY CARD? | ① WANT TO APPLY | ② NO, I DON'T WANT TO APPLY | |

② ABC REVOLVING CARD — ANNUAL FEE : FREE

| (A) TO APPLY FOR BOTH THE ORIGINAL MEMBER AND FAMILY MEMBER | (B) TO APPLY FOR ONLY THE ORIGINAL MEMBER | (C) NOT TO APPLY FOR |
|---|---|---|

METHOD AND APPARATUS FOR IDENTIFICATION OF DOCUMENTS, AND COMPUTER PRODUCT

FIELD OF THE INVENTION

The present invention relates to a technology for comparing feature quantities of image data of a target document with feature quantities of image data of reference images stored beforehand to thereby identify the target document. More particularly, this invention relates to a technology which can prevent mis-identification due to variation in the image, thereby enabling accurate identification of various documents, when documents are identified by using a ruled line which is an intrinsic feature of documents.

BACKGROUND OF THE INVENTION

In many countries, including Japan, China, it is common to use name seals instead of signature. For example, when applying for opening a bank account it is common in these countries to print the name seal instead of making a signature. It is also common to verify the authentication of the name seal printed on the application form with an already obtained print of the name seal of the same person either visually or using a computer. Conventionally, when different kinds of documents are subjected to verification of name seals or recognition of characters within the documents, because the documents may have different formats, it becomes first necessary to each time identify the type of each of the document every time and then perform the verification of the name seal or character recognition depending upon the identified format.

Generally, a identification code or identification mark is printed beforehand at a predetermined position in each document. This identification code or identification mark is confirmed to thereby identify the type of the document. However, since the rule for adding the identification code or identification mark is not always agreed upon between companies, it may happen that the document cannot be identified accurately with only this identification code or identification mark.

A technique for discriminating various documents without depending on the identification code or identification mark is also known. For example, in Japanese Unexamined Patent Publication No. Hei 4-268685, there is disclosed a method of discriminating the type of the document in which segments in the horizontal and vertical directions of ruled lines are extracted from input document image data and divided into a plurality of areas, and the data is subjected to vector patterning, using the direction, length and position of the segment extracted for each area to thereby be compared and verified with a feature vector in a standard pattern.

However, when the segment is extracted and designated as a feature quantity as in the related art, the segment may be broken off due to the quality of the image, for example, due to the property of the scanner, rotation correction or the like. Therefore, if the distance between segments is below a certain threshold, it is necessary to perform interpolation processing or the like for connecting two segments.

The distance between these two segments, however, changes based on the quality the image. When the distance between segments is close to the threshold value, there is a possibility in the interpolation processing that a different operation is performed at the time of extracting the feature quantity of the reference image and at the time of identification processing, thereby causing a problem in that documents cannot be identified accurately.

Figure 6:
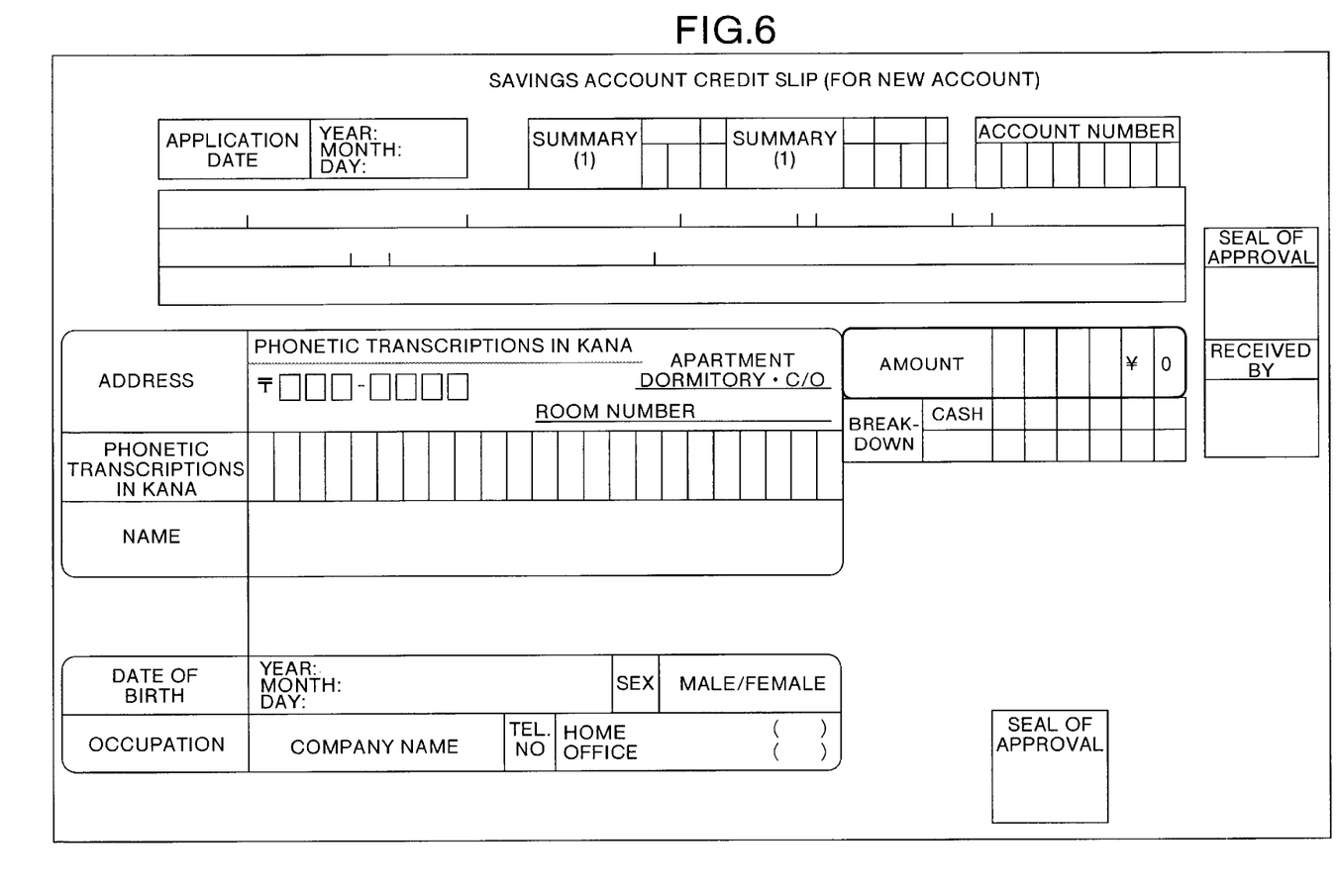
FIG. 6 is a diagram showing one example of a document to be identified in this embodiment.

Specifically, when the processing for interpolating the segment broken off due to the property of the scanner or rotation correction is performed, since segments within a predetermined distance are connected, there is a possibility that not only the broken segment but also originally separate two segments are connected. For example, each rectangular frame of a postal code block in the address box in the document shown in FIG. 6 may be understood as two straight lines in the horizontal direction, to perform an operation different from that of at the time of registration (connection processing may be performed or not), and hence a change in the feature quantity is large, and the performance is unstable.

Therefore, when the document is identified, using a ruled line that is an intrinsic feature of the document, the important problem of how to increase the identification accuracy that decreases due to the bad image quality needs to be given consideration.

SUMMARY OF THE INVENTION

It is an object of this invention to provide a document identification apparatus and document identification methods that can identify documents accurately, while preventing a decrease in the identification accuracy resulting from a change in an image or the like, when various documents are identified using a ruled line which is an intrinsic feature of documents, and a computer readable recording medium recording a program for a computer to execute these methods.

The document identification apparatus, according to a one aspect of this invention, for discriminating various documents by comparing a feature quantity of image data of an input image of a document with a feature quantity of image data of at least one reference image stored beforehand, the document identification apparatus comprises a calculation unit which calculates a black pixel ratio, which black pixel ratio is a ratio of black pixels existing in a predetermined number of continuous pixels in horizontal or vertical direction from a specific pixel in the image data of the input image or the reference image; and an extraction unit which divides the image data into a plurality of blocks, and separately adds the black pixel ratios corresponding to every pixel located in every block to extract a feature quantity of the image data.

The document identification method, according to another aspect of this invention, for discriminating various documents by comparing a feature quantity of image data of an input image of a document with a feature quantity of image data of at least one reference image stored beforehand, the document identification method comprises a calculation step of calculating a black pixel ratio, which black pixel ratio is a ratio of black pixels existing in a predetermined number of continuous pixels in horizontal or vertical direction from a specific pixel in the image data of the input image or the reference image; and an extraction step of dividing the image data into a plurality of blocks, and separately adding the black pixel ratios corresponding to every pixel located in every block to extract a feature quantity of the image data.

According to the present invention, the black pixel ratio showing the ratio of black pixels existing in a predetermined number of pixel rows respectively linked together horizontally or vertically is calculated, for each pixel, from each pixel of image data of the input image or the reference image, the image data is divided into a plurality of blocks, and the black pixel ratio in each pixel located in a block is added for each divided block, to extract a feature quantity of the image data. Therefore, even if variable factors such as a change in information of a ruled line in the input image or handwritten characters are included, a stable feature quantity can be obtained, and hence there is such an effect that a document identification apparatus that can identify the type of the document accurately can be obtained.

The computer readable recording medium, according to still another aspect of this invention, stores a computer program that includes instructions which when executed on a computer realizes the document identification method.

Other objects and features of this invention will become apparent from the following description with reference to the accompanying drawings.

DESCRIPTION OF THE PREFERRED EMBODIMENTS

A preferred embodiment of a document identification apparatus, document identification methods and a computer readable recording medium recording a program for a computer to execute the methods, according to the present invention, will now be described in detail, with reference to the accompanying drawings.

Figure 1:
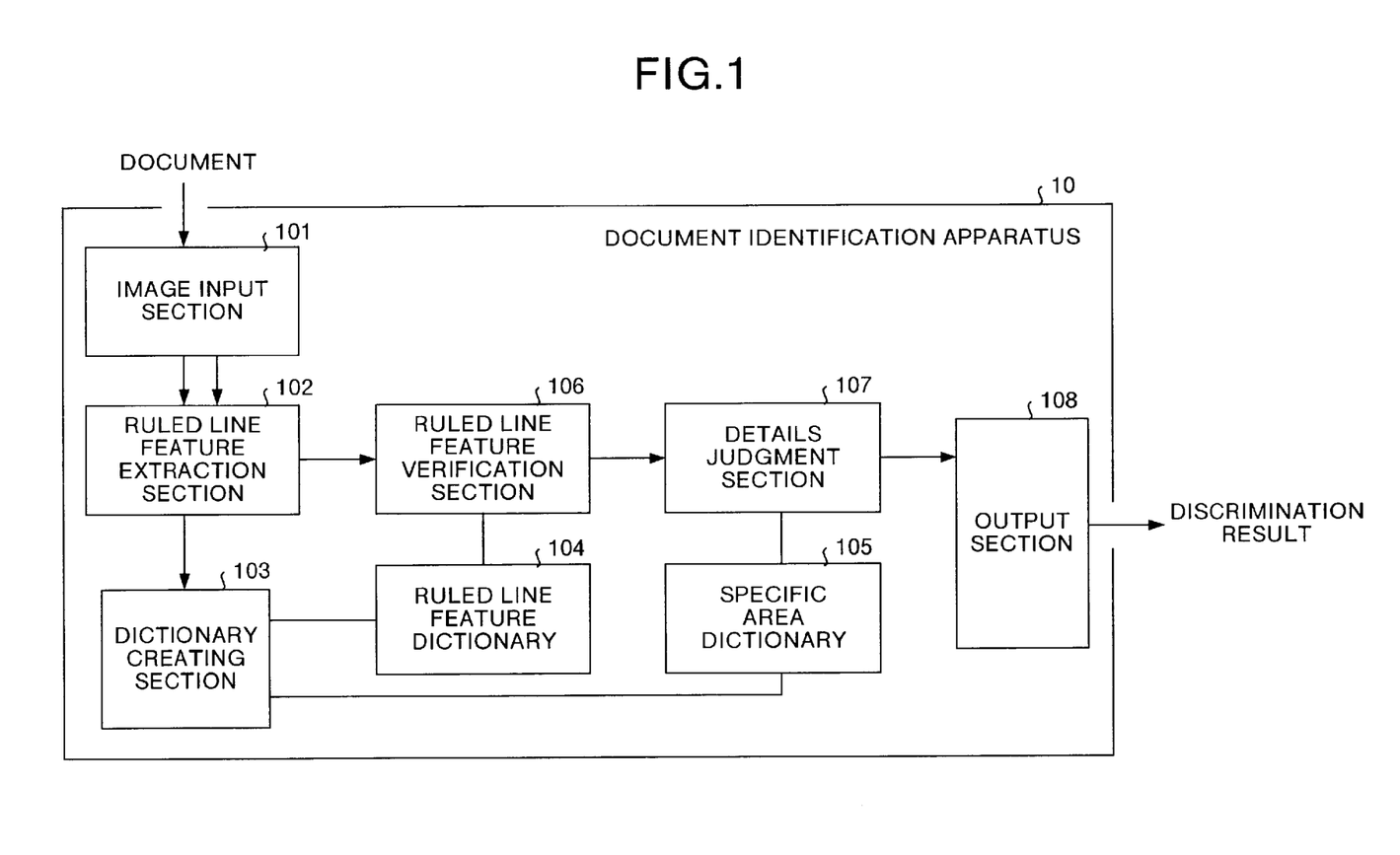
FIG. 1 is a functional block diagram showing the construction of a document identification apparatus used in an embodiment of the present invention.

FIG. 1 is a functional block diagram showing the construction of a document identification apparatus used in an embodiment of the present invention. A document identification apparatus 10 shown in this figure is an apparatus for discriminating the type of the document, by registering a feature quantity of a reference image as a dictionary beforehand, and after inputting an image of a document to be identified, extracting a feature quantity of this input image and comparing it with the dictionary.

The feature quantity used in this document identification apparatus 10 is black pixel ratio, considering a ruled line constituting the essential contents of the document printed beforehand on the document. This apparatus 10 does not perform the segment interpolation processing. The reason behind is that, if such the segment interpolation processing is performed, the accuracy in identification decreases. The black pixel ratio means a ratio of a black pixel included in a pixel row within a predetermined section in the horizontal or vertical direction from a target pixel, and is a value obtained for each pixel of the image data.

Sometimes the type of the document cannot be identified only by the black pixel ratio considering the ruled line. For example, the type of the document cannot be identified when the ruled lines are almost the same and only the characters printed thereon are different. In this case, this document identification apparatus 10 performs detailed identification by utilizing the image data itself (character or the like) in a specific area.

As shown in FIG. 1, this document identification apparatus 10 comprises an image input section 101, a ruled line feature extraction section 102, a dictionary creating section 103, a ruled line feature dictionary 104, a specific area dictionary 105, a ruled line feature verification section 106, a details judgment section 107 and an output section 108. The ruled line feature extraction section 102 corresponds to the calculation unit and the extraction unit, the ruled line feature dictionary 104 corresponds to the memory, and the ruled line feature verification section 106 and the details judgment section 107 correspond to the identification unit.

The image input section 101 is a scanner for optically inputting the image data of the document, and outputs the input image data to the ruled line feature extraction section 102. This image input section 101 outputs a binary image, in which the white pixel has the pixel value of "0", and the black pixel has a pixel value of "1", to the ruled line feature extraction section 102.

The ruled line feature extraction section 102 is a processing section for extracting a ruled line feature (feature quantity) from the binary image data received from the image input section 101. Specifically, when a reference image is input, the ruled line feature and the image data are output to the dictionary creating section 103, and when an image to be identified is input, the ruled line feature and the image data are output to the ruled line feature verification section 106. Here, registration of the reference image or identification of the input image is performed by using a changeover switch (not shown).

The dictionary creating section 103 is a processing section for performing creation or addition of a dictionary based on the information, when the ruled line feature of the reference image and the image data are received from the ruled line feature extraction section 102. Specifically, the dictionary creating section 103 associates the ruled line feature with the type of the document and registers these in the ruled line feature dictionary 104, and associates the image data of a part of the document (specific area) with the type of the document and registers these in the specific area dictionary 105.

The ruled line feature dictionary 104 is a dictionary which stores the ruled line feature associated with each type of the document, and the specific area dictionary 105 is a dictionary which stores the image data of a specific area associated with each type of the document. This specific area dictionary 105 can store the character contents included in the image data in a specific area as text data for each type of the document. At this time, the image data itself is not stored.

The ruled line feature verification section 106 is a processing section for verifying the ruled line feature (feature quantity) of image data of the document to be identified with the ruled line feature (feature quantity) of each reference image stored in the ruled line feature dictionary 104, and selecting a plurality of candidates based on a distance between the image data to be identified and the reference image, to output the candidates together with the image data to the details judgment section 107.

As such a verifying processing, a method widely used in the conventional character recognition or the like can be applied, and for example, identification can be performed based on, for example, the Euclidean distance.

The details judgment section 107 is a processing section for judging in detail which one of the plurality of candidates received from the ruled line feature verification section 106 is closest to the input image. Specifically, the details judgment section 107 cuts out image data of a specific area from the image data of the document to be identified received from the ruled line feature verification section 106, and verifies the image data with the image data registered in the specific area dictionary 105.

Figure 7A:
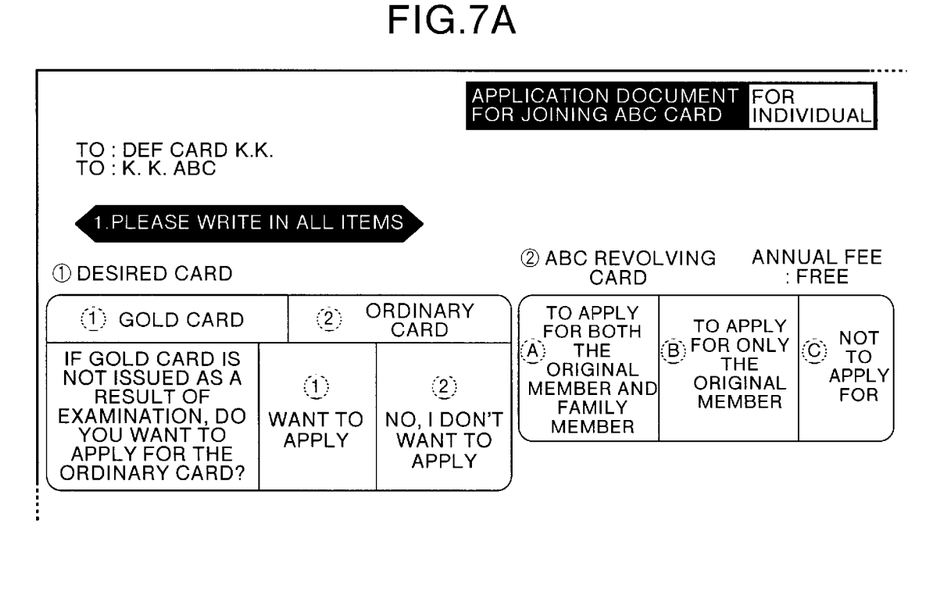
FIG. 7A and FIG. 7B are diagrams for explaining a document to be judged in detail by a details judgment section shown in FIG. 1.
Figure 7B:
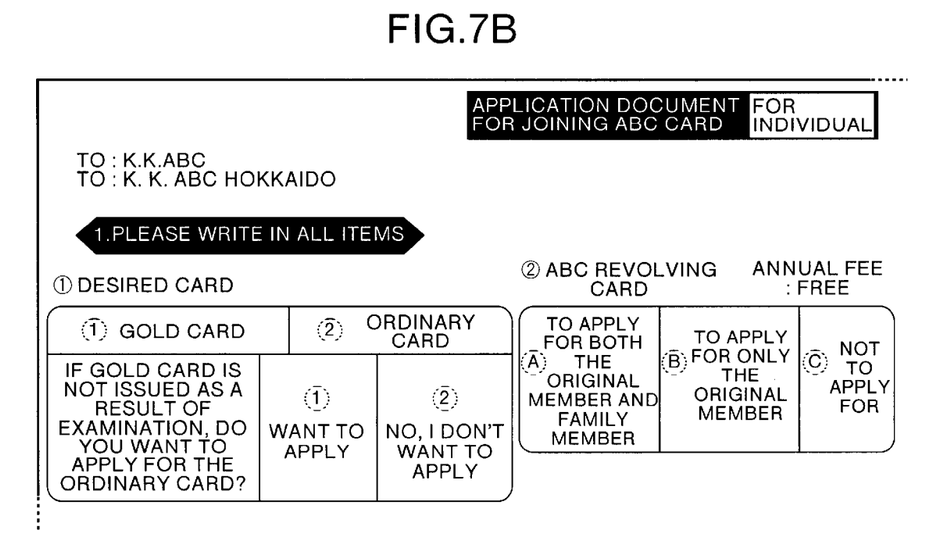

For example, as shown in FIG. 7A and FIG. 7B, when the ruled lines in two documents are identical, since the type of the document cannot be judged only by the ruled line feature, characters (character string or logo featuring the document, such as a document title or company name) included in each specific area of the input image and the reference image are cut out and compared.

Moreover, characters (character string featuring the document, such as a document title or company name) included in each specific area of the reference image are cut out, subjected to character recognition and knowledge processing, and compared with text data of the character contents registered as the specific area of the reference image.

The output section 108 is a processing section for outputting the judgment result received from the details judgment section 107. As this judgment result, a registration document closest to the document to be identified can be output, however, a plurality of candidates may be sequenced and output.

Figure 2A:
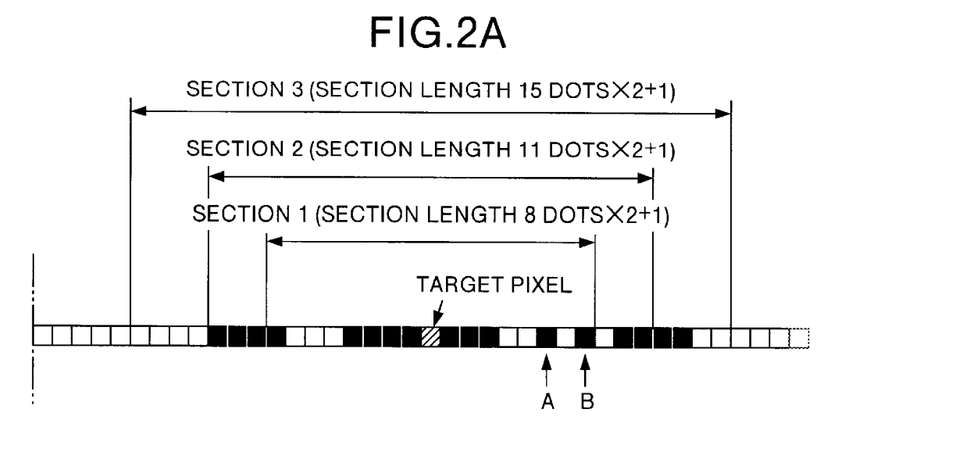
FIG. 2A and FIG. 2B are diagrams for explaining the concept of a processing for extracting a feature of a ruled line by a ruled line feature extraction section shown in FIG. 1.
Figure 2B:
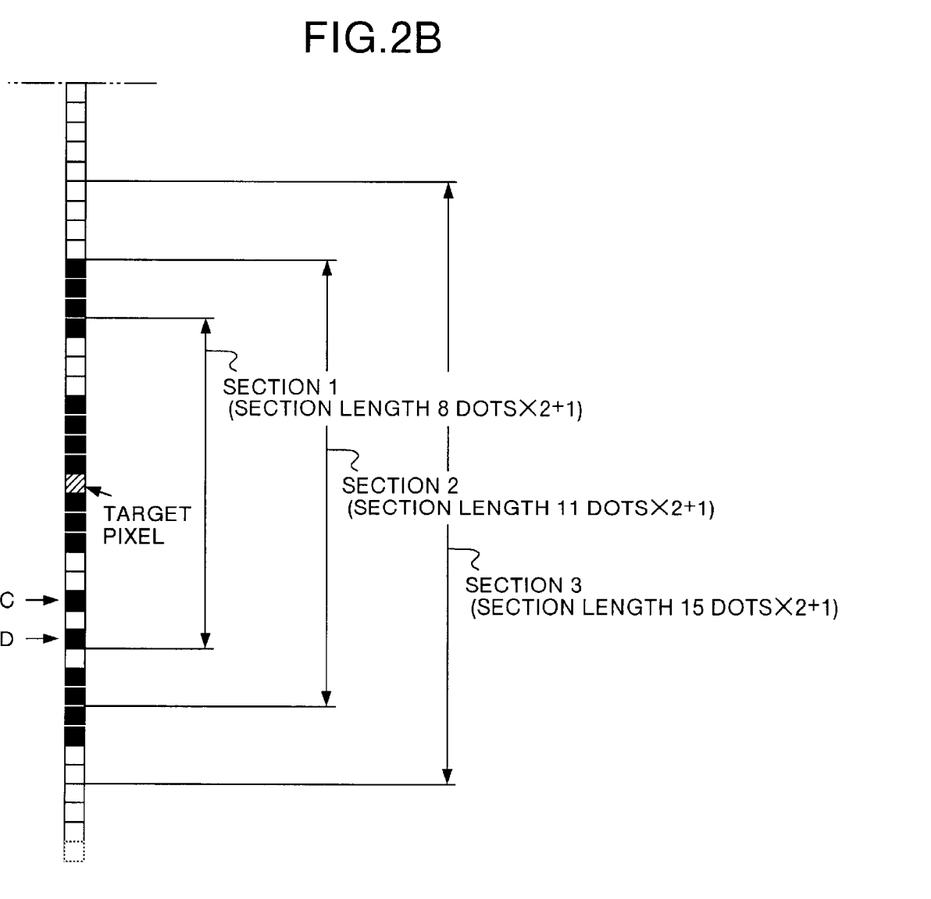

Next, the extraction processing of the ruled line feature of the ruled line feature extraction section 102 shown in FIG. 1 will be described more concretely. FIG. 2A and 2B are diagrams for explaining the concept of a processing for extracting a feature of a ruled line by a ruled line feature extraction section 102 shown in FIG. 1.

As shown in FIG. 2A and FIG. 2B, in this ruled line feature extraction section 102, a ratio of black pixels (black pixel ratio) included in a section P(i) (where i=1, 2, 3, . . ., K) (section length pi×2+1 (dot)) is calculated for each horizontal and vertical direction, centering on a target pixel.

Specifically, in the case of the section 1 in the horizontal direction shown in FIG. 2A, pixel values for 8 pixels, right and left from the target pixel, respectively, are checked. Here, the result is:

Section length=8×2+1=17 dots; and

Number of black pixels in the section=11 dots.

However, in order to eliminate the influence of noise or ruled lines in the vertical direction (ruled lines in the direction different from the calculation direction), one having the connected number of black pixels of a certain threshold value or below is not calculated. For example, in FIG. 2A, since the black pixels A and B has the connected number of 1, these pixels are not calculated.

Therefore, the black pixel ratio becomes (11−2)/17= 0.529. The sections 2 and 3 in the horizontal direction, and the sections in the vertical direction shown in FIG. 2B are similarly calculated.

Thereafter, the document image is divided into M×N blocks, and the black pixel ratio in each pixel in the block is added to obtain the ruled line feature. The number of dimensions of such ruled line feature becomes M×N×2 (horizontal and vertical)×K dimension.

At this time, if it is assumed that addition is performed only when the black pixel ratio is larger than a certain threshold value, variable factors such as noise, handwritten characters and the like can be omitted. It is because handwritten characters and noise are aggregate of short segments compared to the ruled line, and the black pixel ratio in the section becomes also small.

Next, the example of the ruled line feature extracted by the ruled line feature extraction section 102 shown in FIG. 1 will be described more specifically. FIG. 3A to FIG. 3F are diagrams showing extracted examples of the ruled line feature by the ruled line feature extraction section 102 shown in FIG. 1.

Figure 3A:
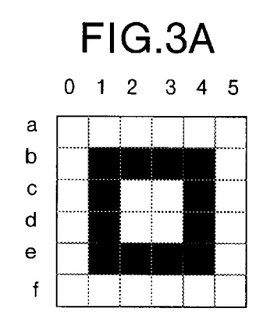
FIG. 3A to FIG. 3F are diagrams showing an example of the ruled line feature extracted by a ruled line feature extraction section shown in FIG. 1.
Figure 3B:
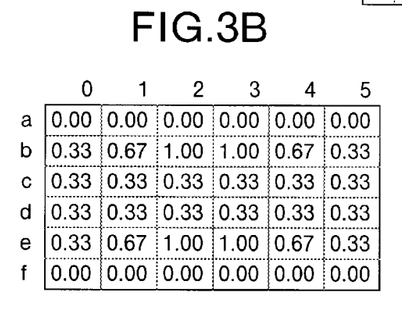
Figure 3C:
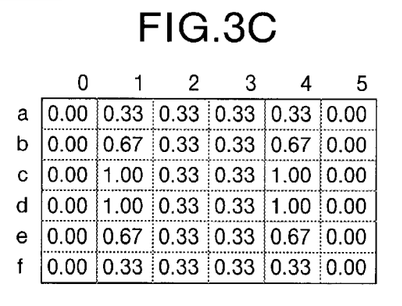

When there is an input symbol of "an open square" as shown in FIG. 3A, if it is assumed that the kind of section is designated as "1", and the section length is 3 dots, and a threshold value of the connected number is not considered, then the black pixel ratio in each pixel in the horizontal direction is as shown in FIG. 3B, and the black pixel ratio in each pixel in the vertical direction is as shown in FIG. 3C.

Figure 3D:
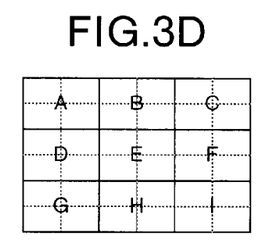
Figure 3E:
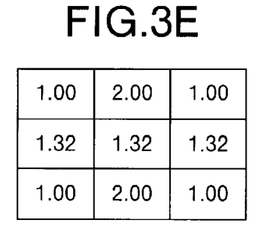
Figure 3F:
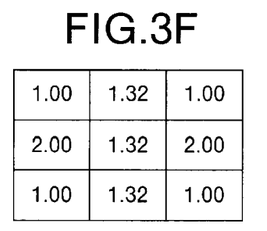

Then, as shown in FIG. 3D, if the image is divided into 3×3 blocks, and the black pixel ratio in each pixel in the horizontal direction shown in FIG. 3B is added for each block, a ruled line feature shown in FIG. 3E can be obtained. Moreover, when the black pixel ratio in each pixel in the vertical direction shown in FIG. 3C is added for each block, a ruled line feature shown in FIG. 3F can be obtained.

As described above, in the ruled line feature extraction section 102, the black pixel ratio and the ruled line feature are made to be a feature quantity, and hence a processing for interpolating a break in the ruled line segment is not required. Moreover, even if the ruled line segment is interrupted due to a processing of a rotation correction or the like, the feature quantity can be stably acquired.

Moreover, if there are a plurality of sections as shown in FIG. 2A and FIG. 2B, ruled line feature having various length can be faithfully obtained. Though it is not performed in this embodiment, a processing for thickening the ruled line before feature extraction may be performed with respect to the input image, to thereby suppress a variation due to a rotation. Also, by applying various processing for increasing the recognition rate, which is widely known in character recognition, such as gradation processing, a feature quantity strong against misalignment may be obtained.

Figure 4:
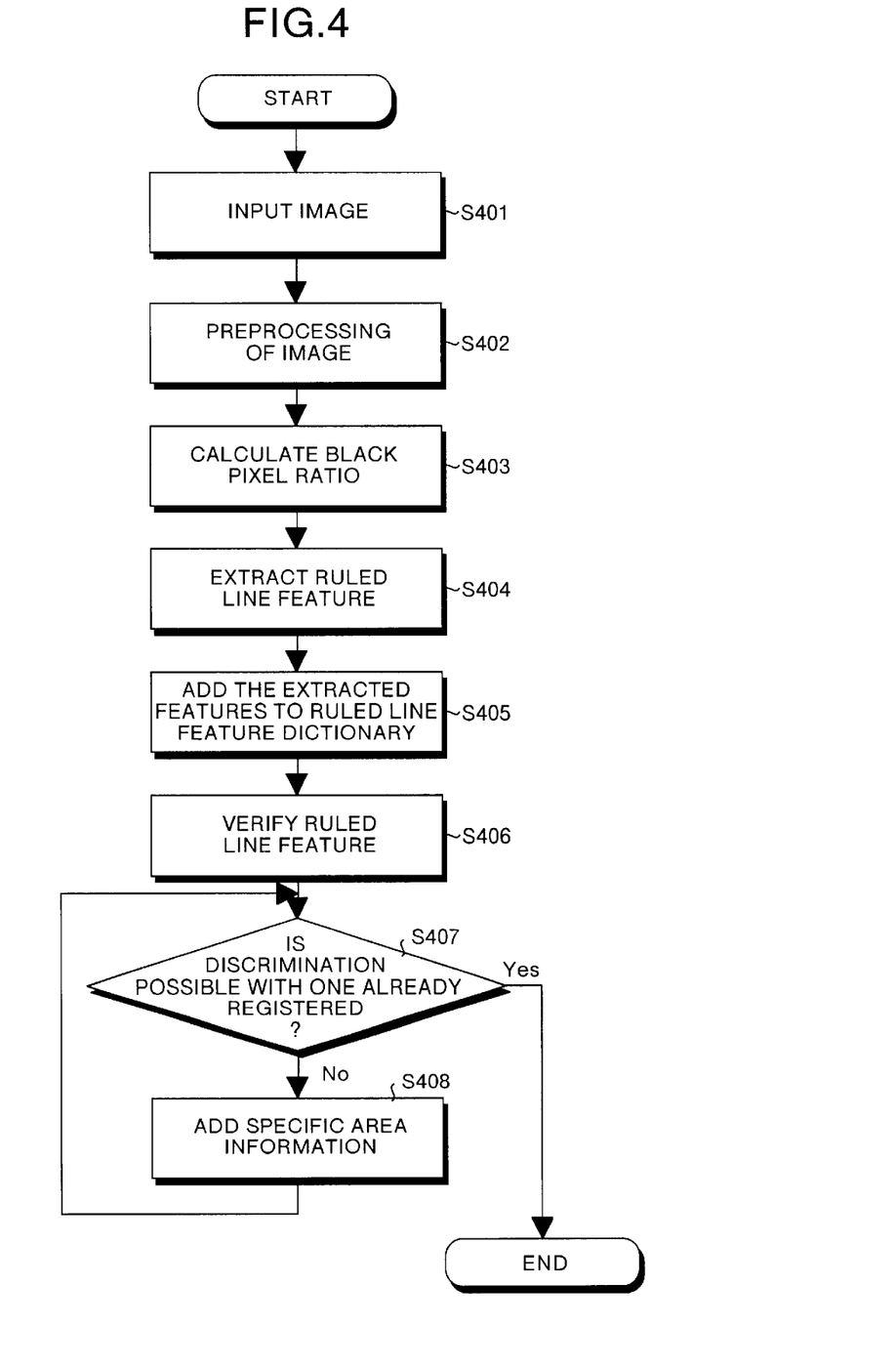
FIG. 4 is a flowchart showing a processing procedure when a document is registered in a dictionary as a comparison object at the time of discriminating various documents.

A processing procedure when a document is registered as a dictionary as a comparison object at the time of identification of various documents will now be described. FIG. 4 is a flowchart showing this procedure when a document is registered as a dictionary as a comparison object at the time of discriminating various documents.

As shown in this figure, when a document is registered as a dictionary as a comparison object at the time of discriminating various documents, at first, an image of the document is taken in from the image input section 101 (step S401), and image preprocessing is performed according to need (step S402). However, this preprocessing does not include an interpolation processing of a segment.

Thereafter, the ruled line feature extraction section 102 calculates the black pixel ratio in the horizontal and vertical directions with respect to a section specified beforehand (step S403), and this black pixel ratio is added for each block to extract the ruled line feature (step S404).

Then, the dictionary creating section 103 registers the ruled line feature extracted by the ruled line feature extraction section 102 in the ruled line feature dictionary 104 (step S405), and thereafter, confirms if identification is possible or not, by verifying this ruled line feature with the ruled line feature registered in past in the ruled line feature dictionary 104 (steps S406 to S407).

As a result, if identification is not possible (NO in step S407), a processing for additionally registering the specific area information (image data in a specific area) in the specific area dictionary 105 is repeated (step S408), and at the time when identification becomes possible (YES in step S407), the processing is completed.

For example, when details judgment is performed by a character string, a character string (text data) in a specific area (character string such as the title or company name) having a feature in each document and its position are registered beforehand.

By performing the above-described series of processing, the ruled line feature and image data of each document are registered as a dictionary in the ruled line feature dictionary 104 and the specific area dictionary 105, respectively, prior to identification of various documents.

Figure 5:
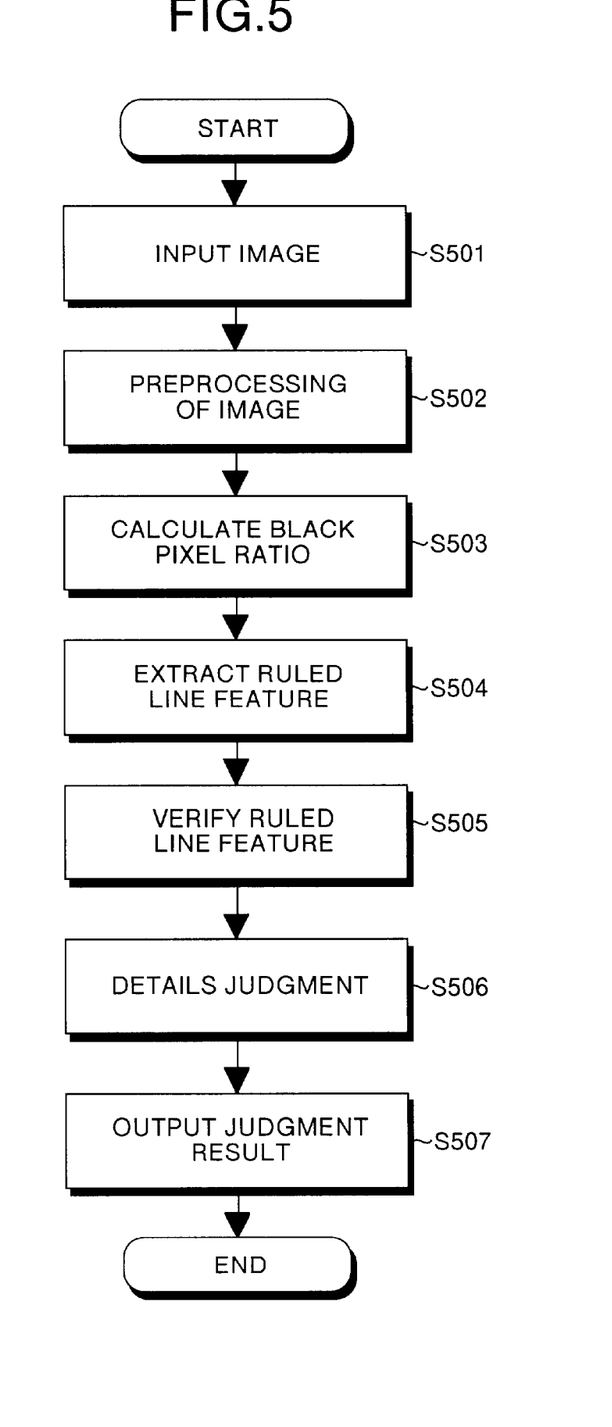
FIG. 5 is a flowchart showing a procedure in a document identification processing by the document identification apparatus shown in FIG. 1.

Next, a procedure in the identification processing of various documents by the document identification apparatus 10 shown in FIG. 1 will be described. FIG. 5 is a flowchart showing a procedure in a document identification processing by the document identification apparatus shown in FIG. 1.

As shown in this figure, when the type of the document is identified, at first, an image of the document is taken in from the image input section 101 (step S501), and image preprocessing is performed according to need (step S502). However, this preprocessing does not include an interpolation processing of a segment.

Thereafter, the ruled line feature extraction section 102 calculates the black pixel ratio in the horizontal and vertical directions with respect to a section specified beforehand (step S503), and this black pixel ratio is added for each block to extract the ruled line feature (step S504).

Then, the ruled line feature verification section 106 verifies the ruled line feature extracted by the ruled line feature extraction section 102 with the ruled line feature registered in the ruled line feature dictionary 104 (step S505), to check if the distance value is within a predetermined threshold value or not, and according to the order of distance, candidates of documents are sorted out in order of the shortest distance.

Then, if the distance value is within a predetermined threshold value, details judgment is performed by the details judgment section 107 (step S506), to output the judgment result (step S507), and if the distance value is not within a predetermined threshold value, the judgment result is directly output via the details judgment section 107 (step S507).

That is to say, of such candidates of documents, if the candidates at the first place and the second place are away from each other more than a certain threshold value, the one at the first place is output as the judgment result. However, if the both candidates are not away from each other, a character string of a specific area is recognized, and if it is still useless, another specific area is also recognized.

By performing such processing, identification of various documents utilizing the ruled line feature and the image data in the specific area based on the ruled line feature dictionary 104 and the specific area dictionary 105 can be performed. Here, a character string cut out from a specific area may be subjected to character recognition, and compared with text data to thereby perform identification.

A computer program that includes instructions which when executed on a computer realizes the document identification method described above is in a computer readable recording medium. The computer readable may be a floppy disk, a CD-ROM, or a hard disk. On the other hand the program may be downloaded, when required, from a server.

As described above, in this embodiment, the ruled line feature extraction section 102 determines a black pixel ratio of a document to be identified, as well as adding the black pixel ratio for each block to extract a ruled line feature. The ruled line feature verification section 106 verifies the ruled line feature with a ruled line feature already registered in the ruled line feature dictionary 104 to thereby identify the document. If identification is not possible with this procedure, the details judgment section 107 verifies the image data in a specific area with the image data (characters or the like) registered in the specific area dictionary 105. As a result, even if variable factors such as a change in ruled line information of the input image or handwritten characters are included, a stable feature quantity can be obtained, thereby the type of the document can be accurately identified. As the section length, for example, 1 cm, 2 cm, 4 cm, 8 cm may be used.

As described above, according to the present invention, even if variable factors such as a change in information of a ruled line in the input image or handwritten characters are included, a stable feature quantity can be obtained, and hence there is such an effect that a document identification method and apparatus that can identify the type of the document accurately can be obtained.

Furthermore, there is such an effect that a document identification method and apparatus that can perform verification of the input image with the reference image and identification of the input image quickly and efficiently can be obtained.

Furthermore, there is such an effect that a document identification method and apparatus that can accurately identify various documents based on characters printed on the documents can be obtained, even in the case where documents cannot be identified by a feature quantity based on a ruled line.

The computer readable recording medium, according to still another aspect of this invention, stores a computer program that includes instructions which when executed on a computer realizes the document identification method. Therefore, the document identification method according to the present invention can be easily and automatically realized using the computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A document identification apparatus for discriminating various documents by comparing a feature quantity of image data of an input image of a document with a feature quantity of image data of at least one reference image stored beforehand, the document identification apparatus comprising:

a calculation unit which calculates a black pixel ratio for every pixel, which black pixel ratio is a ratio of black pixels existing in a predetermined number of continuous pixels in horizontal or vertical direction from a specific pixel in the image data of the input image or the reference image; and an extraction unit which divides the image data into a plurality of blocks, and separately adds the black pixel ratios calculated for every pixel located in every block to extract a feature quantity of the image data.

2. The document identification apparatus according to claim 1, further comprising:
   a memory which stores a feature quantity corresponding to the reference image extracted by the extraction unit; and
   an identification unit which discriminates the document, when the feature quantity corresponding to the input image has been extracted by the extraction unit, by comparing a feature quantity corresponding to the input image with a feature quantity corresponding to the reference image stored in the memory.

3. The document identification apparatus according to claim 2, wherein the identification unit includes,
   a candidate acquisition unit which acquires a plurality of document candidates according to a similarity between the feature quantity of the reference image stored in the memory and the feature quantity corresponding to the input image; and
   a specification unit which specifies a reference image corresponding to the input image, based on the image data of the reference image in each document candidate acquired by the candidate acquisition means and the image data of the input image.

4. The document identification apparatus according to claim 3, wherein the document identification apparatus compares a feature quantity of image data of the input image of the document with the feature quantity of image data of a plurality of reference images stored beforehand,
   wherein the extraction unit corresponds extracts a ruled line feature quantity of the image data,
   the document identification apparatus further comprising:
      a character extraction unit which determines a character-based feature quantity for each of a plurality of predetermined positions of the input image and the reference images;
      a second memory which stores the character-based feature quantities corresponding to each of the reference images extracted by the character extraction unit,
      wherein, when the specification unit cannot specify one of the reference images as corresponding to the input image based on information stored in the memory, the candidate acquisition unit determines a plurality of document candidates based on the character-based feature quantities of the reference images stored in the second memory and the character-based feature quantity of the input image for at least one of the plurality of predetermined positions, and wherein the specification unit specifies one of the reference images corresponding to the input image based on data obtained from both the memory and the second memory.

5. A document identification apparatus according to claim 4, wherein, when the specification unit still cannot specify one of the reference images based on data stored in the memory and the second memory, the specification unit continues to compare the character-based feature quantity of the input image for others of the plurality of predetermined positions of the input image with corresponding character-based feature quantities of each of the reference images, until a determination can be made as to which of the plurality of reference images corresponds closest to the input image.

6. A document identification method of discriminating various documents by comparing a feature quantity of image data of an input image of a document with a feature quantity of image data of at least one reference image stored beforehand, the document identification method comprising:
   a calculation step of calculating a black pixel ratio for every pixel, which black pixel ratio is a ratio of black pixels existing in a predetermined number of continuous pixels in horizontal or vertical direction from a specific pixel in the image data of the input image or the reference image; and
   an extraction step of dividing the image data into a plurality of blocks, and separately adding the black pixel ratios calculated for every pixel located in every block to extract a feature quantity of the image data.

7. The document identification method according to claim 6, further comprising:
   a storage step of storing a feature quantity corresponding to the reference image extracted by the extraction step in a memory; and
   an identification step of discriminating the document, when the feature quantity corresponding to the input image has been extracted in the extraction step, by comparing a feature quantity corresponding to the input image with a feature quantity corresponding to the reference image stored in the memory.

8. The document identification method according to claim 7, wherein the identification step includes,
   a candidate acquisition step of acquiring a plurality of document candidates according to a similarity between the feature quantity of the reference image stored in the memory and the feature quantity corresponding to the input image; and
   a specification step of specifying a reference image corresponding to the input image, based on the image data of the reference image in each document candidate acquired in the candidate acquisition step and the image data of the input image.

9. A computer readable recording medium which stores a computer program which contains instructions which when executed on a computer realizes a document identification method of discriminating various documents by comparing a feature quantity of image data of an input image of a document with a feature quantity of image data of at least one reference image stored beforehand, the document identification method comprising:
   a calculation step of calculating a black pixel ratio for every pixel, which black pixel ratio is a ratio of black pixels existing in a predetermined number of continuous pixels in horizontal or vertical direction from a specific pixel in the image data of the input image or the reference image; and
   an extraction step of dividing the image data into a plurality of blocks, and separately adding the black pixel ratios calculated for every pixel located in every block to extract a feature quantity of the image data.

10. A computer readable recording medium according to claim 9, further comprising:
   a storage step of storing a feature quantity corresponding to the reference image extracted by the extraction step in a memory; and
   an identification step of discriminating the document, when the feature quantity corresponding to the input image has been extracted in the extraction step, by comparing a feature quantity corresponding to the input image with a feature quantity corresponding to the reference image stored in the memory.

11. A computer readable recording medium according to claim 9, wherein the identification step includes, a candidate acquisition step of acquiring a plurality of document candidates according to a similarity between the feature quantity of the reference image stored in the memory and the feature quantity corresponding to the input image; and a specification step of specifying a reference image corresponding to the input image, based on the image data of the reference image in each document candidate acquired in the candidate acquisition step and the image data of the input image.

12. A computer a computer program which contains instructions which when executed on a computer realizes a document identification method of discriminating various documents by comparing a feature quantity of image data of an input image of a document with a feature quantity of image data of at least one reference image stored beforehand, the document identification method comprising:

a calculation step of calculating a black pixel ratio for every pixel, which black pixel ratio is a ratio of black existing in a predetermined number of continuous pixels in horizontal or vertical direction from a specific pixel in the image data of the input image or the reference image; and an extraction step of dividing the image data into a plurality of blocks, and separately adding the black pixel ratios calculated for every pixel located in every block to extract a feature quantity of the image data.

13. A computer program according to claim 12, further comprising:

a storage step of storing a feature quantity corresponding to the reference image extracted by the extraction step in a memory; and an identification step of discriminating the document, when the feature quantity corresponding to the input image has been extracted in the extraction step, by comparing a feature quantity corresponding to the input image with a feature quantity corresponding to the reference image stored in the memory.

14. A computer program according to claim 12, wherein the identification step includes, a candidate acquisition step of acquiring a plurality of document candidates according to a similarity between the feature quantity of the reference image stored in the memory and the feature quantity corresponding to the input image; and a specification step of specifying a reference image corresponding to the input image, based on the image data of the reference image in each document candidate acquired in the candidate acquisition step and the image data of the input image.

* * * * *